US012718353B2

(12) United States Patent
Morash

(10) Patent No.: US 12,718,353 B2
(45) Date of Patent: Aug. 25, 2026

(54) METHOD TO QUALIFY ADDITIONAL DIES AFTER MASTER DIE

(71) Applicant: Pratt & Whitney Canada Corp., Longueuil (CA)

(72) Inventor: Michael Morash, Avondale (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 284 days.

(21) Appl. No.: 18/392,890

(22) Filed: Dec. 21, 2023

(65) Prior Publication Data

US 2025/0209607 A1 Jun. 26, 2025

(51) Int. Cl.

| | |
|---|---|
| ***G06T 7/00*** | (2017.01) |
| ***B29C 37/00*** | (2006.01) |
| ***G01N 21/88*** | (2006.01) |
| ***G01N 21/95*** | (2006.01) |
| *B29L 31/08* | (2006.01) |

(52) U.S. Cl.

CPC .............. *G06T 7/001* (2013.01); *B29C 37/00* (2013.01); *G01N 21/8806* (2013.01); *G01N 21/8851* (2013.01); *G01N 21/9515* (2013.01); *B29C 2037/90* (2013.01); *B29L 2031/08* (2013.01); *G01N 2021/8854* (2013.01); *G01N 2201/061* (2013.01); *G06T 2207/30136* (2013.01)

(58) Field of Classification Search

None

See application file for complete search history.

(56) References Cited

U.S. PATENT DOCUMENTS

| | | | |
|---|---|---|---|
| 8,706,281 B2 | 4/2014 | Lettenbauer et al. | |
| 2004/0151611 A1* | 8/2004 | Kline | B22F 3/1283 419/49 |
| 2004/0262277 A1 | 12/2004 | Mika et al. | |
| 2008/0126019 A1 | 5/2008 | Lanzarotta et al. | |
| 2022/0176448 A1* | 6/2022 | Noguchi | B22F 3/005 |
| 2023/0314116 A1* | 10/2023 | Propheter-Hinckley | G06T 17/00 73/865.8 |
| 2025/0205778 A1* | 6/2025 | Morash | B22C 9/00 |

FOREIGN PATENT DOCUMENTS

| | | |
|---|---|---|
| CN | 115017642 A | 9/2022 |
| DE | 102011121695 A1 | 6/2013 |
| EP | 4249727 A2 | 9/2023 |
| WO | 2016/193790 A1 | 12/2016 |

OTHER PUBLICATIONS

How to use 3D scanning for metal parts. Feb. 24, 2021. Retrieved from the Internet: https://www.die-casting-china.com/en/Design/3D_scanning/.

European Search Report for EP Application No. 24218869.6 dated May 14, 2025.

* cited by examiner

*Primary Examiner* — Dov Popovici

(74) *Attorney, Agent, or Firm* — Carlson, Gaskey & Olds, P.C.

(57) ABSTRACT

A method of qualifying an addition die includes the steps of obtaining a master die that has been certified, and performing a master 3D scan on the master die. A second 3D scan is performed on an additional die made according to original specifications of the master die. The second 3D scan is compared to the master 3D scan of the master die. Then, the additional die is certified for production should the second 3D scan of the additional die be acceptably close to the master 3D scan of the master die.

14 Claims, 5 Drawing Sheets

METHOD TO QUALIFY ADDITIONAL DIES AFTER MASTER DIE

BACKGROUND

This application relates to a method of simply qualifying an additional die which is made after a master die has been qualified.

Dies are utilized in number of applications. One type die is a metal cast die. In such a die, metal is injected into a cavity, and forms a component.

One common use of such dies is to form components having an airfoil such as turbine blades, static vanes, compressor blades, and compressor static vanes.

In the prior art after die manufacture, and before moving to production, the die must be certified. Typically, the die is utilized to form a relatively large number of components to be inspected, known as a qualification lot. As an example, there may be on the order of two dozen components made.

The formed components are then subject to detailed inspection to ensure that they meet dimensional requirements. It is only after the inspection of the produced components is passed that the die is moved towards production.

All of these steps put in place a long lead time between ordering a die, and having it ready for production.

SUMMARY

A method of qualifying an addition die includes the steps of obtaining a master die that has been certified, and performing a master 3D scan on the master die. A second 3D scan is performed on an additional die made according to original specifications of the master die. The second 3D scan is compared to the master 3D scan of the master die. Then, the additional die is certified for production should the second 3D scan of the additional die be acceptably close to the master 3D scan of the master die.

These and other features will be best understood from the following drawings and specification, the following is a brief description.

DETAILED DESCRIPTION

Figure 1A:
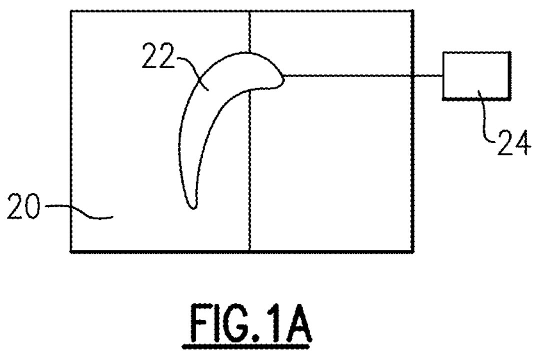
FIG. 1A schematically shows a die.

FIG. 1A shows a die 20 schematically. As known, a cavity 22 receives injected metal from a source 24.

Figure 1B:
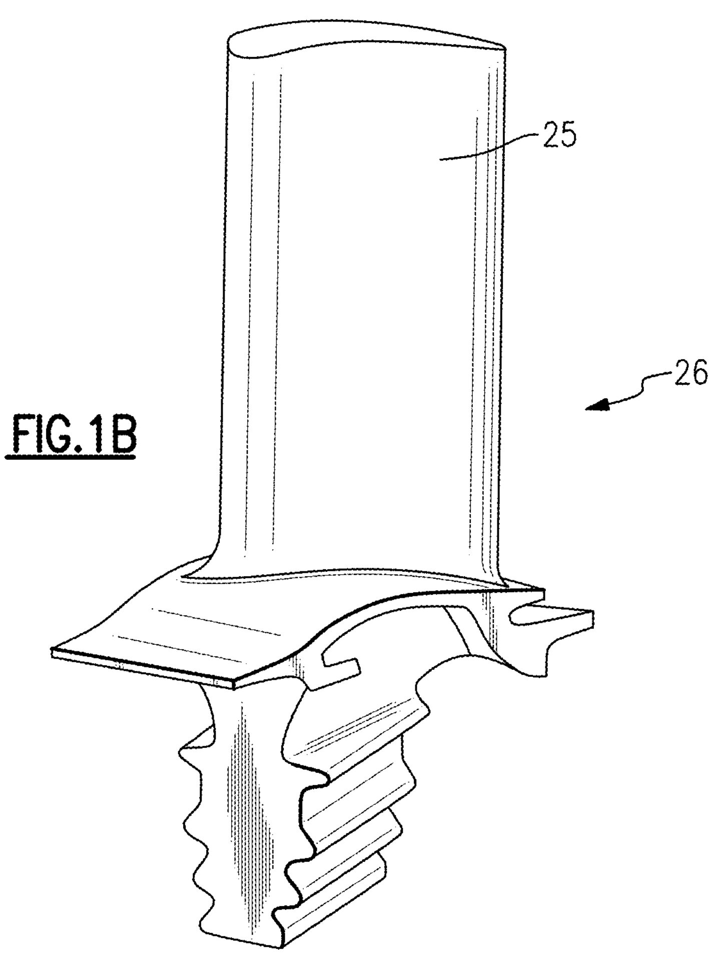
FIG. 1B schematically shows a gas turbine engine airfoil component formed by a die.

One component which may be formed by such a die is shown in FIG. 1B. Here a turbine blade 26 has an airfoil 25. While a turbine blade is specifically disclosed, it should be understood that other gas turbine engine components may be formed using metal cast dies such as the FIG. 1A die.

As well known, airfoils are complex structures, and have demanding dimensional challenges in forming the desired structure. For this reasons, dies to form an airfoil are subject to intense qualification tests before being utilized to make production airfoils.

In the prior art, and before a die is utilized in production, it must first be certified.

In one common method of certification, the die is built, and then utilized to produce what is called a qualification lot. As an example, this may be on the order of two dozen components, or more. Those produced components are then inspected and compared to desired dimensions, etc. It is only after this inspection has been passed that the die would be moved toward production. In the prior art, this qualification was performed not only for an initial die, but for all subsequent dies made to be identical to an initial or master die.

Figure 2:
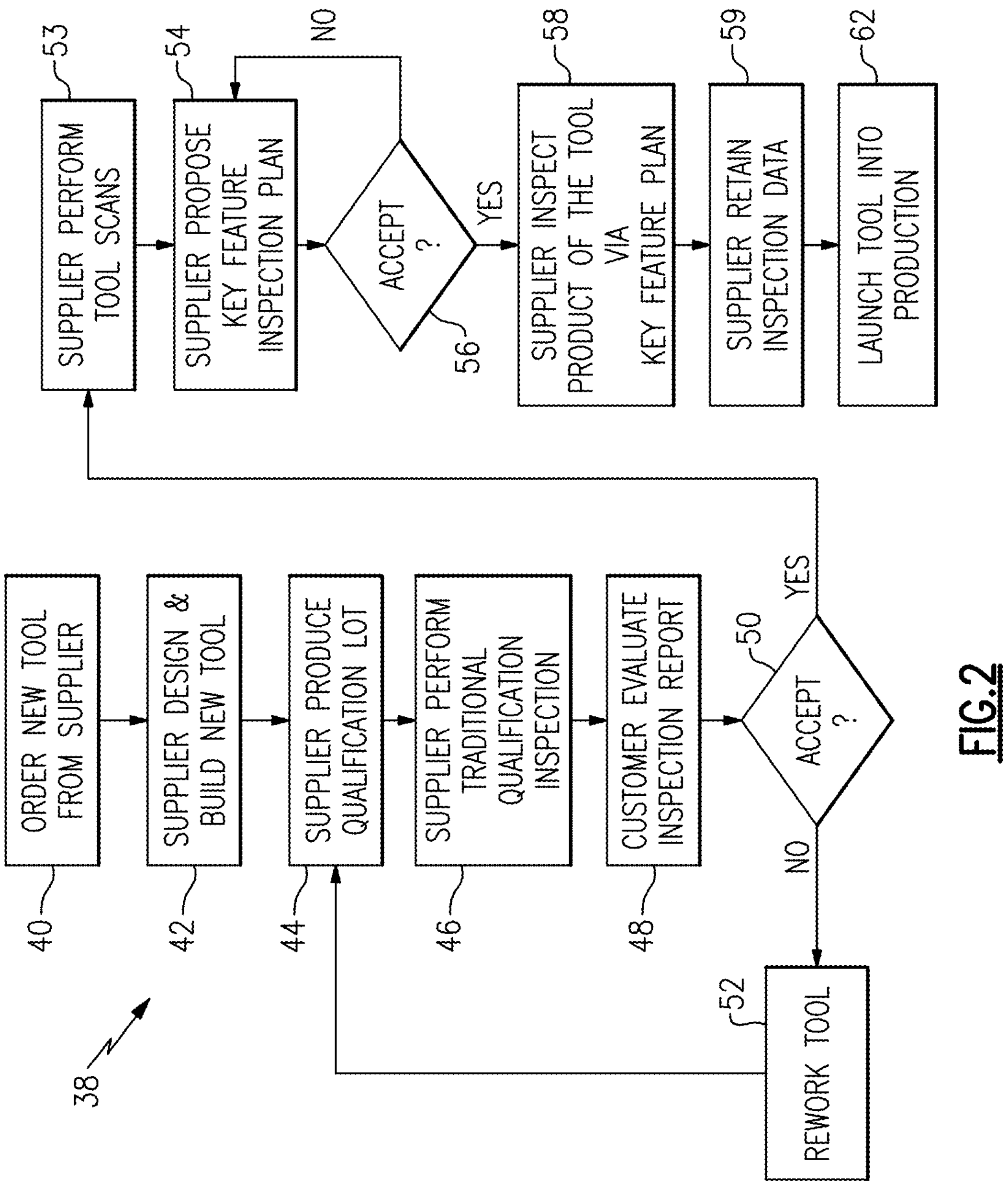
FIG. 2 is a flow chart of a method for certifying a master die initially.

FIG. 2 shows a method 38 for qualifying an initial or master die under this disclosure. At step 40, a die may be ordered. The die is then designed and built as a master die at step 42.

A traditional inspection is then performed on the qualification lot at step 46. The results, or the layout, are evaluated at step 48.

At step 50, a decision is made whether to accept the layout. If not, the die is reworked at step 52, and the flow chart returns to step 44.

If the layout is accepted at step 50 then, a 3D scan of a master die is performed at step 53. In one embodiment, a structured light scan may be utilized to scan the master die.

At step 58 an inspection is made of products of the tool via a key feature plan. At step 59 inspection data is retained and the master die is launched into production at step 62.

Notably, the steps 42, 44, 46, 52, 53, 54, 56, 58 and 59 may all be performed by a supplier to a customer who will utilize the master die. That supplier will be working at the direction of the customer. Alternatively, a single company may provide the role of "supplier" and customer. That is, the customer may manufacture the master die.

Figure 4:
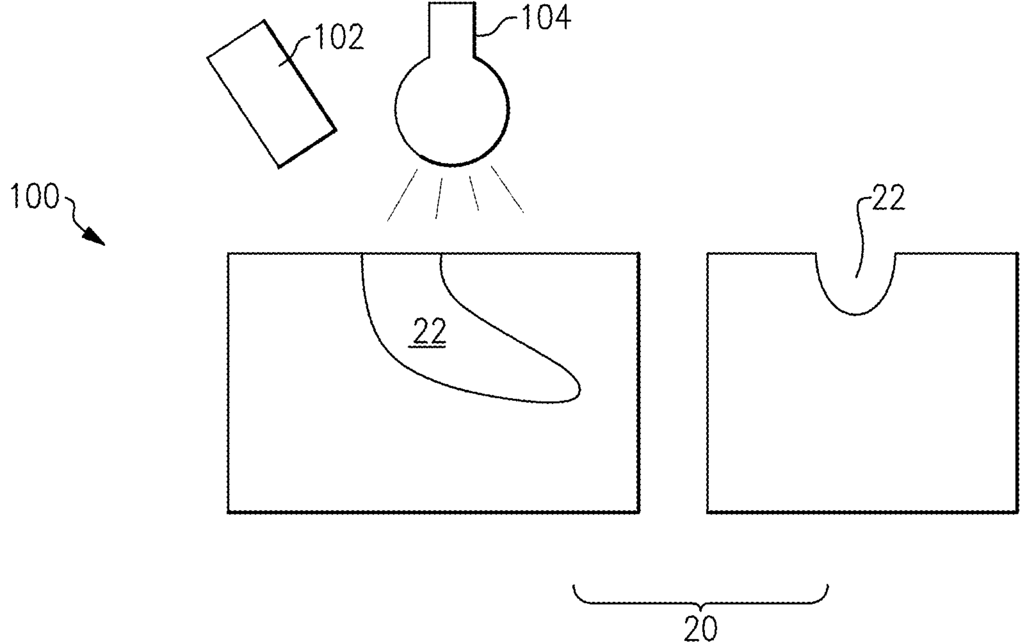
FIG. 4 shows a scanning system to be used in this method.

FIG. 4 schematically shows a simple system 100 for performing the 3D scans. As shown, a camera 102 takes photos of the interior of the cavity 22 as illuminated by a structured light scanning system 104. Other type scanning systems may be used.

The initial master die scan is preferably compared to a die model to ensure the die scan's integrity.

At step 54 a die inspection plan is proposed, and a decision is made whether the die inspection plan is acceptable at step 56. If not, the flow chart returns to step 54 such that the inspection plan may be modified. Key features are inspected on the product of the die at step 58, and compared to the Master Die key feature inspection.

The evidence may be a simple product of a die thickness across both die halves, and at both die cavity ends.

Figure 3:
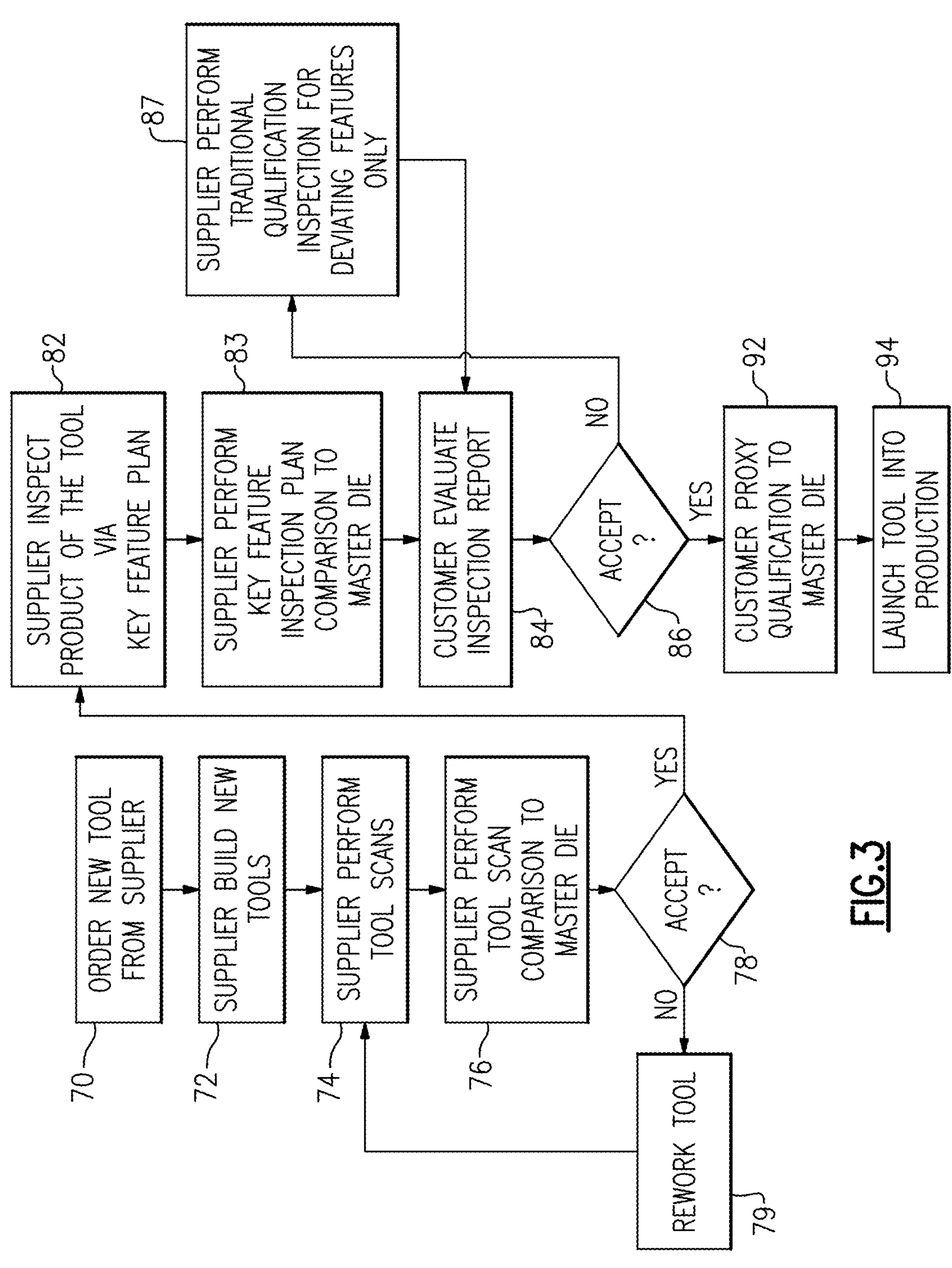
FIG. 3 is a flow chart associated with the FIG. 2 method, and wherein an additional die may be certified based upon comparison to a certified master die.

In FIG. 3, at step 70 an additional die is ordered. At step 72 the additional die is built.

At step 74 a 3D scan of the additional die, such as by structured light scanning is performed. Again, the FIG. 4 system may be used.

Figure 5:
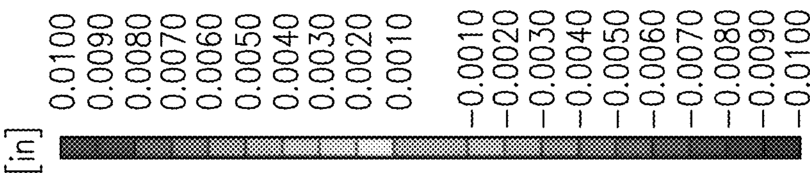
FIG. 5 shows a comparison between two scans.
Figure 5:
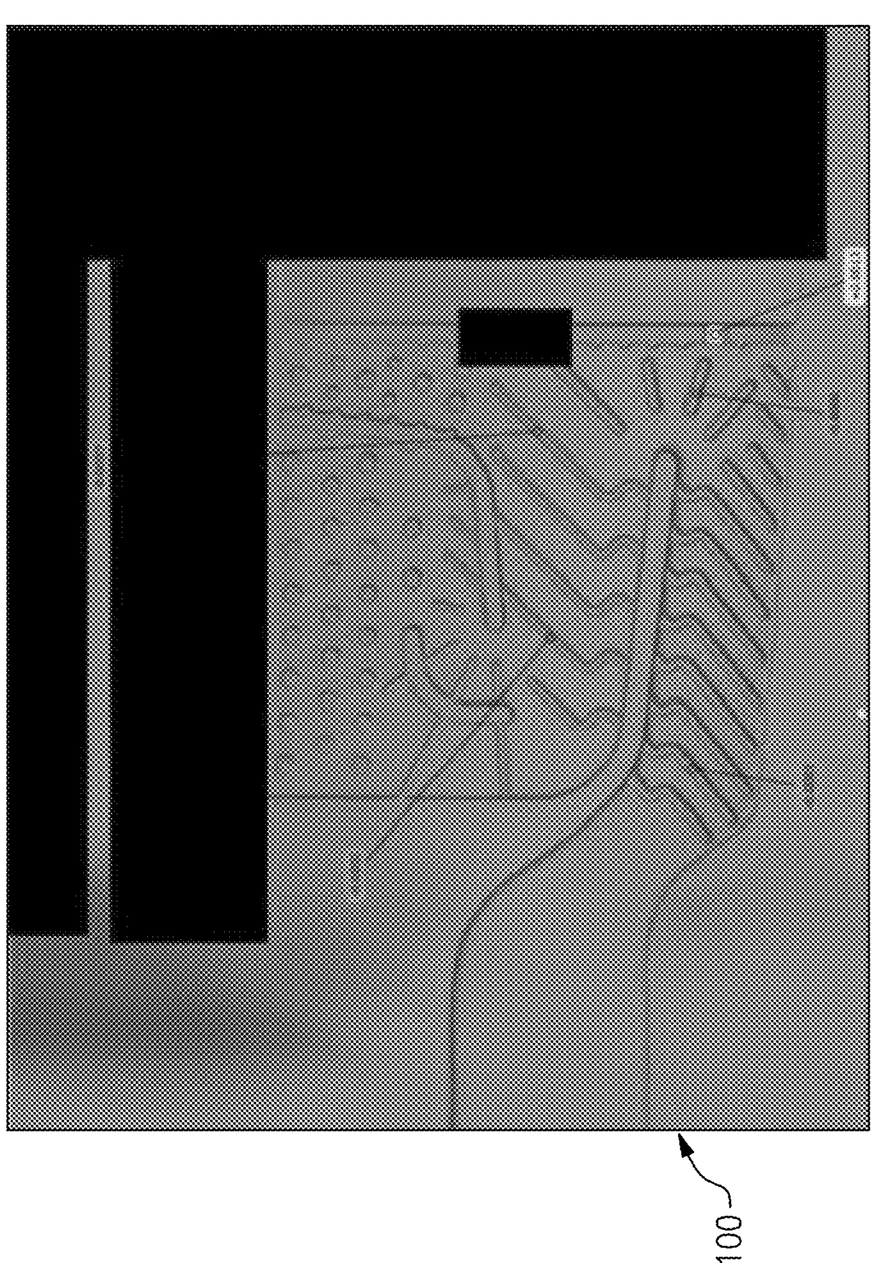

At step 76 the 3D scan of the additional die is then compared to the scanned information from the master die. FIG. 5 shows a map 100 of the two scans overlied on each other for comparison (step 76). A scale is shown to the right to facilitate the comparison.

Notably, the structured light software utilized for the master die is preferably the same as that utilized for the additional die. Moreover, the same company will preferably do both scans and will ensure proper die preparation, camera position and view angles such that these are all the same for both scans.

At step 78 the question is asked whether the results meet the requirements.

If the results do not meet requirements at step 78 then the tool is reworked at step 79, and returned to step 74.

If the result of step 78 is that the additional die is found acceptable, then there will be an inspection of product of the tool via a key feature plan at step 82. At step 83, a key feature inspection plan is compared to the master die at step 83. At step 84, the inspection report is evaluated. At step 86, a decision is made whether the inspection report is acceptable. If not, then it returns to step 87 where a traditional qualification inspection is provided only for deviating features.

If the additional die is found acceptable at step 86 then the die is provided with proxy qualification due to its closeness to the master die at step 92, and launched into production at step 94.

Notably, as with the FIG. 2 method, the bulk of the FIG. 3 steps may be performed by a supplier. Namely steps 72, 74, 76, 78, 79, 82, 83 and 87 may all be performed by the supplier, with a customer for the additional die of performing the other steps. Here again, the supplier would be working at the direction of the customer. Also, a single company may provide the role of both supplier and customer in embodiments.

If there are subsequent changes to the casting process that change the master die, it may be that the changed die must then be requalified using the FIG. 2 flow chart.

A method of qualifying an addition die under this disclosure could be said to include the steps of obtaining a master die that has been certified, and performing a master 3D scan on the master die. A second 3D scan is performed on an additional die made according to original specifications of the master die. The second 3D scan is compared to the master 3D scan of the master die. Then, the additional die is certified for production should the second 3D scan of the additional die be acceptably close to the master 3D scan of the master die.

In another embodiment according to the previous embodiment, the addition die is utilized in production to form components.

In another embodiment according to any of the previous embodiments, the component includes an airfoil.

In another embodiment according to any of the previous embodiments, the master die is qualified by building a master die, and producing a qualification lot of components from the master die, then performing inspection on the qualification lot components and accepting or rejecting the master die based upon that inspection.

In another embodiment according to any of the previous embodiments, if the master die is rejected, then the master die is reworked and returned to produce an additional qualification lot for inspection.

In another embodiment according to any of the previous embodiments, if the second 3D scan of the additional die is not acceptably close to the master 3D scan of the master die then the additional die is reworked and a third scan is taken and compared to the master scan.

In another embodiment according to any of the previous embodiments, the master 3D scan and the second 3D scan are performed using structured light scanning.

In another embodiment according to any of the previous embodiments, if the second 3D scan of the additional die is not acceptably close to the master 3D of the master die scan then the additional die is reworked and a third scan is taken and compared to the master scan.

In another embodiment according to any of the previous embodiments, the master 3D scan and the second 3D scan are performed using structured light scanning.

In another embodiment according to any of the previous embodiments, the master die is qualified by building a master die, and producing a qualification lot of components from the master die, then performing inspection on the qualification lot components and accepting or rejecting the master die based upon that inspection.

In another embodiment according to any of the previous embodiments, if the master die is rejected, then the master die is reworked and returned to produce an additional qualification lot for inspection.

In another embodiment according to any of the previous embodiments, if the second 3D scan of the additional die is not acceptably close to the master 3D scan of the master die then the additional die is reworked and a third scan is taken and compared to the master scan.

In another embodiment according to any of the previous embodiments, the master 3D scan and the second 3D scan are performed using structured light scanning.

In another embodiment according to any of the previous embodiments, if the second 3D scan of the additional die is not acceptably close to the master 3D scan of the master die then the additional die is reworked and a third scan is taken and compared to the master scan.

In another embodiment according to any of the previous embodiments, the master 3D scan and the second 3D scan are performed using structured light scanning.

In another embodiment according to any of the previous embodiments, the master die is qualified by building a master die, and producing a qualification lot of components from the master die, then performing inspection on the qualification lot components and accepting or rejecting the master die based upon that inspection.

In another embodiment according to any of the previous embodiments, if the master die is rejected, then the master die is reworked and returned to produce an additional qualification lot for inspection.

In another embodiment according to any of the previous embodiments, if the second 3D scan of the additional die is not acceptably close to the master 3D scan of the master die then the additional die is reworked and a third scan is taken and compared to the master scan.

In another embodiment according to any of the previous embodiments, if the second 3D scan of the additional die is not acceptably close to the master 3D scan of the master die then the additional die is reworked and a third scan is taken and compared to the master scan.

In another embodiment according to any of the previous embodiments, the master 3D scan and the second 3D scan are performed using structured light scanning.

Although embodiments have been disclosed, a worker of skill in this art would recognize that modifications would come within the scope of this disclosure. For that reason, the following claims should be studied to determine the true scope and content.

What is claimed is:

1. A method of qualifying an addition die comprising the steps of:

obtaining a master die that has been certified, and performing a master 3D scan on the master die;

performing a second 3D scan on an additional die made according to specifications of the master die;

comparing the master 3D scan of the master die to the second 3D scan of the additional die;

certifying the additional die for production should the second 3D scan of the additional die be acceptably close to the master 3D scan of the master die; and wherein the master die is qualified by building an initial master die, and producing a qualification lot of components from the initial master die, then performing inspection on the qualification lot components and accepting or rejecting the initial master die based upon that inspection.

2. The method as set forth in claim 1, wherein the additional die is utilized in production to form components.

3. The method as set forth in claim 2, wherein the components include an airfoil.

4. The method as set forth in claim 3, wherein if the second 3D scan of the additional die is not acceptably close to the master 3D scan of the master die then the additional die is reworked and a third scan is taken and compared to the master 3D scan.

5. The method as set forth in claim 4, wherein the master 3D scan and the second 3D scan are performed using structured light scanning.

6. The method as set forth in claim 2, wherein if the second 3D scan of the additional die is not acceptably close to the master 3D scan of the master die-scan then the additional die is reworked and a third scan is taken and compared to the master scan.

7. The method as set forth in claim 6, wherein the master 3D scan and the second 3D scan are performed using structured light scanning.

8. The method as set forth in claim 2, wherein if the second 3D scan of the additional die is not acceptably close to the master 3D scan of the master die then the additional die is reworked and a third scan is taken and compared to the master 3D scan.

9. The method as set forth in claim 8, wherein the master 3D scan and the second 3D scan are performed using structured light scanning.

10. The method as set forth in claim 1, wherein if the master die is rejected, then the master die is reworked and returned to produce an additional qualification lot for inspection.

11. The method as set forth in claim 10, wherein if the second 3D scan of the additional die is not acceptably close to the master 3D scan of the master die then the additional die is reworked and a third scan is taken and compared to the master 3D scan.

12. The method as set forth in claim 1, wherein the master 3D scan and the second 3D scan are performed using structured light scanning.

13. A method of qualifying an addition die comprising the steps of:

obtaining a master die that has been certified, and performing a master 3D scan on the master die;

performing a second 3D scan on an additional die made according to specifications of the master die;

comparing the master 3D scan of the master die to the second 3D scan of the additional die;

certifying the additional die for production should the second 3D scan of the additional die be acceptably close to the master 3D scan of the master die; and wherein if the second 3D scan of the additional die is not acceptably close to the master 3D scan of the master die then the additional die is reworked and a third scan is taken and compared to the master scan.

14. The method as set forth in claim 13, wherein the master die is qualified by building an initial master die, and producing a qualification lot of components from the initial master die, then performing inspection on the qualification lot components and accepting or rejecting the initial master die based upon that inspection.

* * * * *